US007660834B2

(12) United States Patent  
Cannon et al.

(10) Patent No.: US 7,660,834 B2
(45) Date of Patent: *Feb. 9, 2010

(54) MAINTAINING AN AGGREGATE INCLUDING ACTIVE FILES IN A STORAGE POOL

(75) Inventors: David Maxwell Cannon, Tucson, AZ (US); Howard Newton Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 405 days.

This patent is subject to a terminal disclaimer.

(21) Appl. No.: 11/206,488

(22) Filed: Aug. 17, 2005

(65) Prior Publication Data

US 2007/0043785 A1 Feb. 22, 2007

(51) Int. Cl.
*G06F 12/00* (2006.01)
(52) U.S. Cl. .................. 707/203; 707/205; 715/229
(58) Field of Classification Search .............. None
See application file for complete search history.

(56) References Cited

U.S. PATENT DOCUMENTS

| 5,644,766 | A | * | 7/1997 | Coy et al. ................ 707/204 |
| 5,761,677 | A | * | 6/1998 | Senator et al. ............ 707/203 |
| 5,819,295 | A | | 10/1998 | Nakagawa et al. |
| 5,920,867 | A | | 7/1999 | Van Huben et al. |
| 5,983,239 | A | | 11/1999 | Cannon |
| 6,021,415 | A | | 2/2000 | Cannon et al. |
| 6,023,706 | A | | 2/2000 | Schmuck et al. |
| 6,098,074 | A | | 8/2000 | Cannon et al. |
| 6,330,572 | B1 | | 12/2001 | Sitka |
| 6,351,753 | B1 | * | 2/2002 | Jagadish et al. ............ 707/203 |
| 6,366,988 | B1 | | 4/2002 | Skiba et al. |

(Continued)

FOREIGN PATENT DOCUMENTS

JP 62281038 12/1987

OTHER PUBLICATIONS

PCT International Search Report and Written Opinion mailed Nov. 10, 2006 for PCT/EP2006/063511 filed Jun. 23, 2006.

(Continued)

*Primary Examiner*—Khanh B Pham
*Assistant Examiner*—Andalib F Lodhi
(74) *Attorney, Agent, or Firm*—David W. Victor; Konrad Raynes and Victor LLP

(57) ABSTRACT

Provided are a method, system, and program for maintaining an aggregate including active files in a storage pool. One active-only storage pool is included in a plurality of storage pools. Each storage pool includes files and the active-only storage pool is intended to include only active files and not inactive versions of files. The active-only storage pool includes at least a first aggregate including a plurality of files. One file is deactivated in the first aggregate in the active only storage pool to produce an inactive version of the file, wherein the first aggregate includes the inactive version of the file. A determination is made of inactive versions of files in the first aggregate. A second aggregate is generated in the active only storage pool including the active files from the first aggregate and not including the determined inactive versions of files from the first aggregate. The second aggregate replaces the first aggregate in the active-only storage pool.

40 Claims, 7 Drawing Sheets

U.S. PATENT DOCUMENTS

| | | | |
|---|---|---|---|
| 6,886,018 B1 * | 4/2005 | Boudris et al. | 707/203 |
| 6,889,249 B2 | 5/2005 | Miloushev et al. | |
| 7,024,429 B2 | 4/2006 | Ngo et al. | |
| 7,039,661 B1 * | 5/2006 | Ranade | 707/204 |
| 7,069,401 B1 * | 6/2006 | Noonan et al. | 711/162 |
| 7,096,330 B1 * | 8/2006 | Root et al. | 711/162 |
| 7,130,970 B2 * | 10/2006 | Devassy et al. | 711/154 |
| 7,191,552 B1 | 3/2007 | Husom | |
| 7,243,103 B2 | 7/2007 | Murphy et al. | |
| 2001/0042073 A1 * | 11/2001 | Saether et al. | 707/203 |
| 2002/0120763 A1 | 8/2002 | Miloushev et al. | |
| 2003/0078930 A1 | 4/2003 | Surcouf et al. | |
| 2003/0154220 A1 | 8/2003 | Cannon | |
| 2003/0154238 A1 | 8/2003 | Murphy et al. | |
| 2004/0133577 A1 | 7/2004 | Miloushev et al. | |
| 2004/0186826 A1 | 9/2004 | Choi et al. | |
| 2004/0199521 A1 | 10/2004 | Anglin et al. | |
| 2005/0137731 A1 * | 6/2005 | Haag et al. | 700/97 |
| 2005/0165722 A1 | 7/2005 | Cannon et al. | |
| 2005/0229031 A1 | 10/2005 | Kojenov et al. | |
| 2007/0005666 A1 * | 1/2007 | Klein et al. | 707/203 |
| 2007/0043785 A1 | 2/2007 | Cannon et al. | |
| 2007/0043788 A1 | 2/2007 | Cannon et al. | |
| 2007/0043789 A1 | 2/2007 | Cannon et al. | |

OTHER PUBLICATIONS

U.S. Application entitled "Maintaining an Aggregate Including Active Files in a Storage Pool in a Random Access Medium", IBM, filed Aug. 15, 2005, serial number not yet assigned, by inventors D.M. Cannon and H.N. Martin.

J.J. Daudenarde, et al., "Implementation of a File System with a Fast and Selective Recovery", IBM Corporation, Technical Disclosure Bulletin, Feb. 1987, pp. 3837-3838.

EPO document entitled "Communication pursuant to Article 94(3) EPC" dated Jun. 9, 2008, pp. 1-6, for application Serial No. 06 777 449.7-2201.

EPO document entitled "Communication pursuant to Article 94(3) EPC" dated Jun. 6, 2008, pp. 1-5, for application Serial No. 06 763 848.6-2201.

Translation of First Office Action from Chinese (PRC) Patent Office for Application No. 2006800283150, dated Jul. 17, 2009, 10 pp.

Translation of First Office Action from Chinese (PRC) Patent Office for Application No. 2006800283841, dated Jul. 17, 2009, 10 pp.

First Office Action, dated Jul. 17, 2009, from Chinese (PRC) Patent Office for CN Application No. 2006800283841, 5 pp.

First Office Action, dated Jul. 17, 2009, from Chinese (PRC) Patent Office for CN Application No. 2006800283150, 7 pp.

First Office Action for U.S. Appl. No. 11/206,496, dated Jan. 2, 2008, 23 pp.

Final Office Action for U.S. Appl. No. 11/206,496, dated Jul. 9, 2008, 17 pp.

Notice of Allowance for U.S. Appl. No. 11/206,496, dated Jan. 29, 2009, 12 pp.

First Office Action for U.S. Appl. No. 11/224,852, dated Dec. 27, 2007, 16 pp.

Final Office Action for U.S. Appl. No. 11/224,852, dated Jun. 25, 2008, 15 pp.

Notice of Allowance for U.S. Appl. No. 11/224,852, dated Jan. 6, 2009, 15 pp.

First Office Action for U.S. Appl. No. 11/224,768, dated Dec. 13, 2007, 16 pp.

Final Office Action for U.S. Appl. No. 11/224,768, dated Jun. 11, 2008, 14 pp.

Notice of Allowance for U.S. Appl. No. 11/224,768, dated Dec. 16, 2008, 10 pp.

* cited by examiner

File/Aggregate Information

Aggregate Information

Aggregate File Information

Active-Only Storage Pool

MAINTAINING AN AGGREGATE INCLUDING ACTIVE FILES IN A STORAGE POOL

BACKGROUND OF THE INVENTION

1. Field of the Invention

The present invention relates to a method, system, and program for maintaining an aggregate including active files in a storage pool.

2. Description of the Related Art

Storage management software maintains a repository for data by backing-up, archiving or migrating data from client nodes in a computer network. A storage management server stores data objects or files in one or more storage pools maintained in storage devices. The storage management server may use a database to track information about the stored files, including their location, status, policy information on the files, etc. The storage management software may also be used to restore data. The storage management software may maintain a hierarchy of storage devices, where a first level of the hierarchy includes the faster access devices, such as disk drives, storing more frequently used and accessed files. Lower levels in the hierarchy provide slower access storage devices, such as lower performance disk drives and tape drives, to store less frequently accessed or inactive data. One example of storage management software is the Tivoli® Storage Manager product marketed by International Business Machines Corporation (IBM®). (Tivoli and IBM are registered trademarks of IBM).

To improve data transfer performance, the storage management software may aggregate individual files in a storage pool, so that moving and copying operations may be performed with respect to an aggregate of files instead of single files. U.S. Pat. No. 6,098,074 describes an aggregation technique in which objects being stored are aggregated into a "managed file." The objects may thereafter be tracked and moved as a single managed file within the storage hierarchy. When appropriate, individual objects can be processed individually such as for deletion or retrieval operations. The co-pending and commonly assigned patent application entitled "Method, System, And Program For Storing Data For Retrieval And Transfer", having Ser. No. 10/766,576 and filed on Jan. 27, 2004, describes further techniques for managing files in aggregates.

As the amount of data users store in storage pools continues to increase, files and aggregates of files are increasingly migrated to lower levels in the storage hierarchy. Thus, data that may need to be restored may have been migrated to a slower access device, such as a tape storage media, which has a low restore performance. Further, to restore data from tape, the data may first be staged from tape to a hard disk drive pool and then restored from the hard disk drive.

Further improvements in data storage may be useful in a variety of applications.

SUMMARY

Provided are a method, system, and program for maintaining an aggregate including active files in a storage pool. One active-only storage pool is included in a plurality of storage pools. Each storage pool includes files and the active-only storage pool is intended to include only active files and not inactive versions of files. The active-only storage pool includes at least a first aggregate including a plurality of files. One file is deactivated in the first aggregate in the active only storage pool to produce an inactive version of the file, wherein the first aggregate includes the inactive version of the file. A determination is made of inactive versions of files in the first aggregate. A second aggregate is generated in the active only storage pool including the active files from the first aggregate and not including the determined inactive versions of files from the first aggregate. The second aggregate replaces the first aggregate in the active-only storage pool.

In a further embodiment, the file is deactivated as a result of an update to the file. Updating the file produces an active version of the file in addition to the inactive version of the file. The active version of the file is included in the active-only storage pool and not included in the second aggregate.

In a further embodiment, the active-only storage pool comprises a sequential access storage pool in which files in the aggregate are written sequentially and the aggregates are periodically processed to generate the second aggregate including only active files from the processed aggregate. The active files in the generated second aggregate are written sequentially.

In a further embodiment, the determined inactive version of files in the first aggregate are copied to another storage pool.

In a further embodiment, a copy of the first aggregate is generated in an additional storage pool of the plurality of storage pools, wherein the copy maintains the determined inactive version of files in the first aggregate.

In a further embodiment, the first aggregate has a first identifier and the second aggregate has a second identifier. A data structure is provided having information on defined aggregates including an aggregate identifier and storage pool for each indicated aggregate. Information on the first aggregate is removed from the data structure in response to generating the second aggregate and information on the second aggregate is added to the data structure including the second identifier in response to generating the second aggregate.

In a further embodiment, the file is deactivated as a result of an update to the file, wherein updating the file produces an active version of the file in addition to the inactive version of the file. Information is added to the data structure for the active version of the file having a third identifier and indicating that the active version of the file is in the active-only storage pool.

In a further embodiment, information for aggregates in the data structure indicates a cumulative size of all files included in the aggregate and a number of files included in the aggregate.

In a further embodiment, the data structure comprises a first data structure. A second data structure is provided having information on files included in aggregates including the aggregate identifier of the aggregate including the file, wherein the aggregate identifier for the files is the first identifier before the second aggregate is generated. The aggregate identifier for files indicated in the second data structure having the first identifier is updated to the second identifier in response to generating the second aggregate.

In a further embodiment, the information in the second data structure for the determined inactive files having the second identifier is updated to indicate that the files are not included in the second aggregate.

In a further embodiment, indicating that the inactive files are not included in the second aggregate comprises setting a length of the inactive files indicated in the second data structure to indicate that the file was removed.

DETAILED DESCRIPTION

Figure 1:
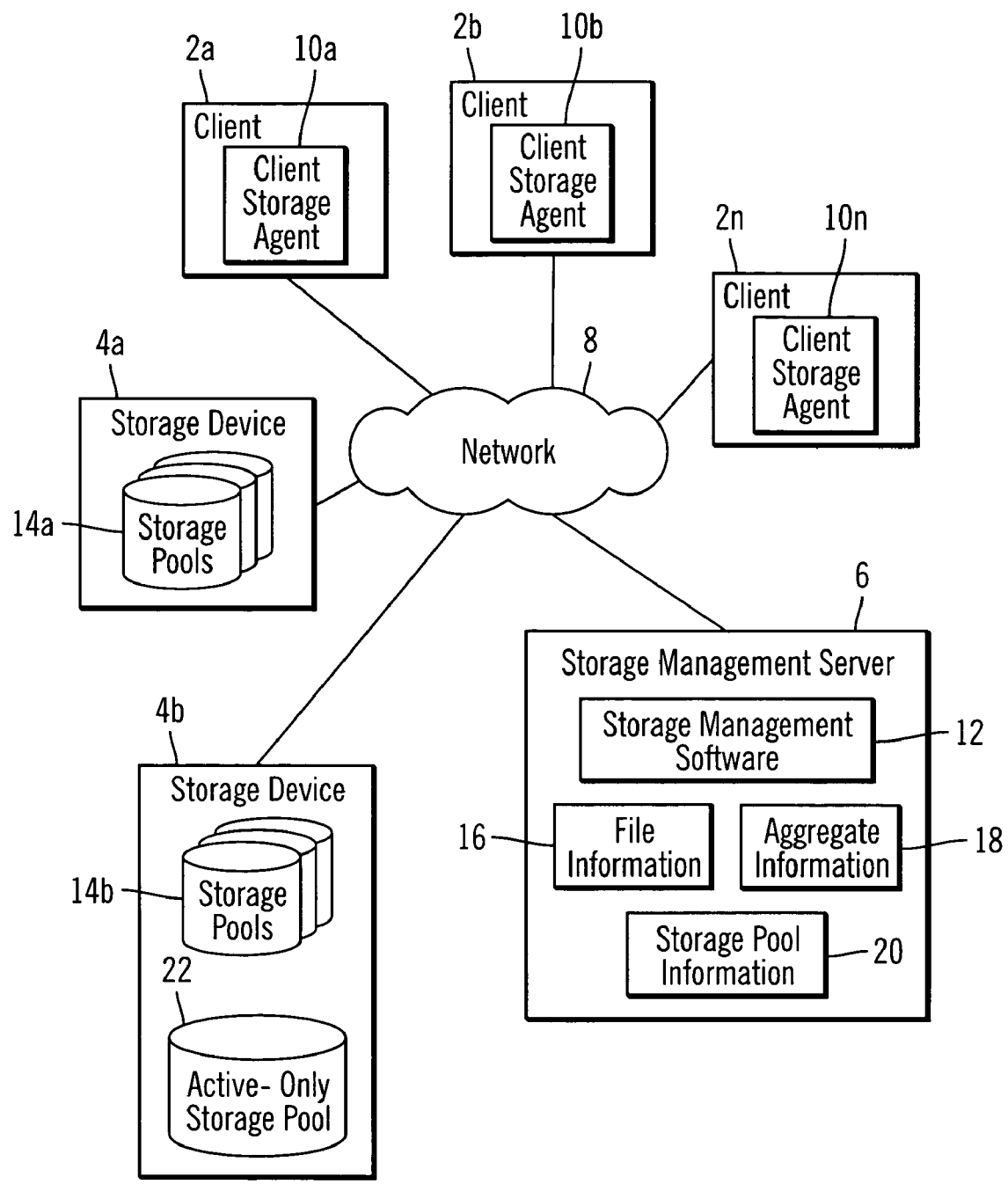
FIG. 1 illustrates an embodiment of a network computing environment.

FIG. 1 illustrates a computing environment in which embodiments are implemented. A plurality of clients 2a, 2b . . . 2n, storage devices 4a, 4b, and a storage management server 6 are in communication over a network 8. The storage management server 6 may access storage devices 4a, 4b over the network 8. Alternatively, a storage device may be attached directly to the storage management server 6 and accessed over a bus. The clients 2a, 2b . . . 2n include client storage agents 10a, 10b . . . 10n and the storage management server 6 includes storage management software 12. The client storage agents 10a, 10b . . . 10n and the storage management software 12 interact to manage the storage of files in storage pools 14a, 14b implemented in the storage devices 4a, 4b. The storage management software 12 may maintain a storage hierarchy system in which storage pools 14a, 14b are defined to have level information, such that files at a higher level may be migrated to a lower level according to a hierarchical storage policy, e.g., to move less frequently accessed files to storage pools at a lower level in the hierarchy having slower access devices. The storage in the higher level may comprise faster access devices, such as hard disk drives, whereas the storage at lower levels may comprise slower access devices, such as slower hard disk drives, tape drives, etc. For instance, storage pools high in the hierarchy include more frequently or recently used data and are implemented in relatively faster access storage devices, whereas storage pools lower in the hierarchy may provide more long term storage of data and be implemented in a tape storage medium. In certain embodiments, the client storage agents 10a, 10b . . . 10n may access, backup, archive and restore data through the storage management software 12, which manages access to files in the storage pools 14a, 14b. Further, the storage management software 12 may backup and archive data from the clients 2a, 2b, 2c.

The storage management software 12 maintains information on the files in the storage pools, including file information 16, aggregate information 18, and storage pool information 20. The information 16, 18, and 20 may be implemented in one or more database tables of a relational database or other suitable data structures known in the art. The file information 16 may comprise an inventory table having information on every file in the storage pools 14a, 14b, including client and policy information. The aggregate information 18 comprises information on aggregates defined in the storage pools 14a, 14b. An aggregate comprises a managed file in one storage pool in which one or more files are written. An aggregate simplifies file movement operations (e.g., storage pool backup, restore, reclamation or movement to another pool which includes migration to another location within the hierarchy) because the storage management software 12 need only specify a data transfer operation with respect to an aggregate, and the storage management software 12 will then perform the requested operation with respect to the files grouped by the aggregate. Further, an aggregate may provide for the storage of the associated files in a single managed file that may be readily subject to a data transfer operation.

The storage pool information 20 contains information about where each file is stored in the storage hierarchy implemented in the storage pools 14a, 14b. The storage table contains an entry for each managed file.

A storage pool 14a, 14b may be implemented as a sequential access storage pool in which data is stored sequentially in a file volume, where the volume is a file in the underlying file system. Space from a deleted file in a sequential-access disk pool is recovered by consolidating valid data on a new file volume during a reclamation operation. Additionally, the storage pools 14a, 14b may also be organized as a random-access disk pools in which space is allocated in random blocks, such that once a file is deleted from a random-access storage pool, the space is immediately available for use.

In one embodiment, a storage pool may be defined as an active only storage pool 22, such that only active files are maintained in that storage pool 22, not inactive files. An inactive file is any file that has been deactivated according to some criteria. For instance, a file may be considered inactive if it is updated, deleted or is a file whose age exceeds an aging policy. A file may be updated or deleted on a client system 2a, 2b . . . 2n, and then when that update is supplied to the storage management server 6, the deactivated file may be marked as inactive. A file may also be updated or deleted directly by the storage management software 12. An update to a file results in both an active version of the file having the update and an inactive version of the pre-updated file.

In one embodiment, the active-only storage pool 22 may be implemented as a sequential-access disk pool, such that all files in an aggregate stored in the active-only storage pool 22 are written sequentially to a sequential file volume in the storage pool 22. A sequential file volume comprises a file on a random access media, such as a hard disk drive, that is managed as a tape device where data is written sequentially. The aggregate and its included files are written to a sequential file volume. A storage pool can have multiple sequential file volumes and each sequential file volume can have one or more aggregates. When the sequential file volume reaches a predefined size, then the sequential file volume is closed and a new sequential file volume is added to the storage pool to fill-up. So an update can be in the same file volume including the aggregate having the unmodified version of the file or in a different file in the active-only storage pool.

The clients 2a, 2b . . . 2n may comprise a suitable computational device known in the art, such as a workstation, desktop computer, server, mainframe, hand held computer, telephony device, etc. The storage management server 6 may comprise a suitable server class machine. The network 8 may comprise a Local Area Network (LAN), Storage Area Network (SAN), Wide Area Network (WAN), wireless network, etc. The storage devices 4a, 4b be implemented in storage devices known in the art, such as one hard disk drive, a plurality of interconnected hard disk drives configured as Direct Access Storage Device (DASD), Redundant Array of Independent Disks (RAID), Just a Bunch of Disks (JBOD), etc., a tape device, an optical disk device, a non-volatile electronic memory device (e.g., Flash Disk), a tape library, etc.

Figure 2:
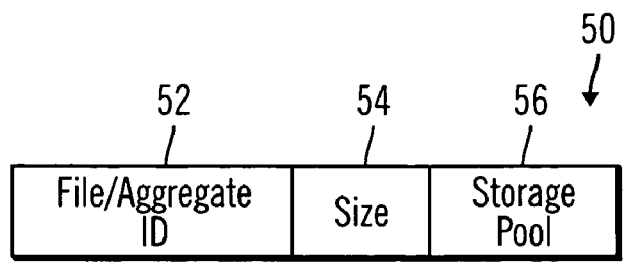
FIGS. 2, 3, and 4 illustrate embodiments of information on files and aggregates of files maintained in storage pools.

FIG. 2 illustrates an embodiment of file/aggregate information 50 maintained for every aggregate managed file and file outside of an aggregate managed file within a storage pool. The file/aggregate information 50 may be part of the aggregate information 18. Each file/aggregate information 50 instance includes an identifier (ID) 52 of the file or aggregate managed file; a size 54 (e.g., byte length) of the file or aggregate, where an aggregate size is the size of all files included in the aggregate managed file; and a storage pool 56 identifying the storage pool 14a, 14b including the file or aggregate managed file.

Figure 3:
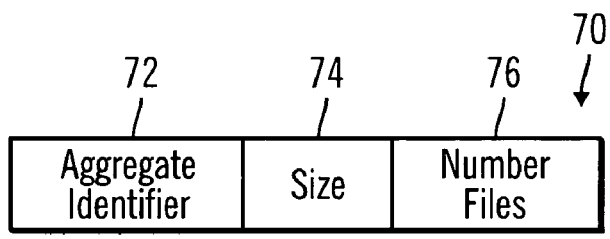

FIG. 3 illustrates an embodiment of aggregate information 70 maintained for every aggregate managed file. The aggregate information 70 may be part of the aggregate information 18. Each aggregate information 70 instance includes: an identifier 72 of the aggregate; a size 74 of all the files included in the aggregate managed file; and a number of files (objects) 76 included in the aggregate managed file.

Figure 4:
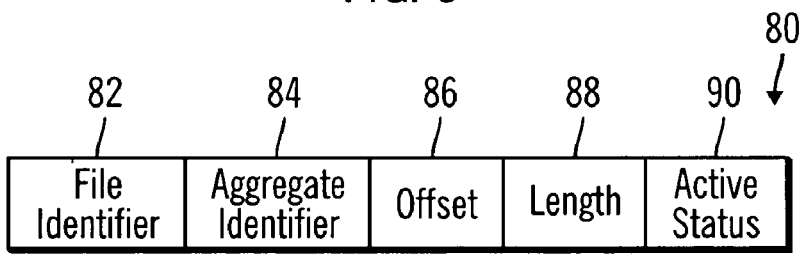

FIG. 4 illustrates an embodiment of aggregate file information 80 maintained for every file included in one aggregate managed file. The aggregate information 70 may be part of the file information 16 or the aggregate information 18. Each aggregate file information 80 instance includes: a file identifier 82, such as the file name; an aggregate identifier 84 indicating the aggregate in which the file is included; an offset 86 indicating the byte offset from the beginning of the aggregate managed file at which the file starts; a length 88 of the file; and an active status 90 indicating whether the file is active or inactive.

Figure 5:
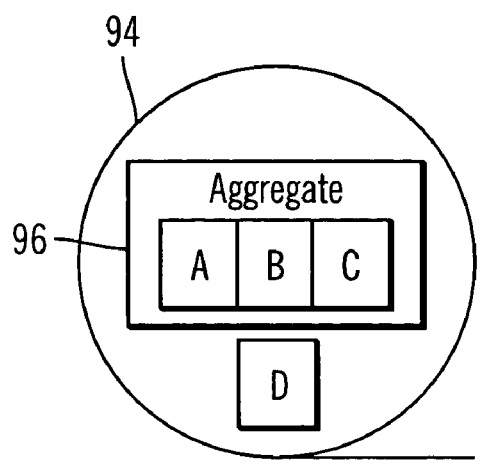
FIG. 5 illustrates an embodiment of an active-only storage pool.

FIG. 5 illustrates an active-only storage pool 94 implemented as a sequential access device including one aggregate 96 having three files A, B, C in one of the storage devices 4a, 4b. Files added to the aggregate may be added sequentially following the last file written to the aggregate 96. The active-only storage pool 96 may include additional aggregates as well as files not included in an aggregate, such as file D.

Figure 6:
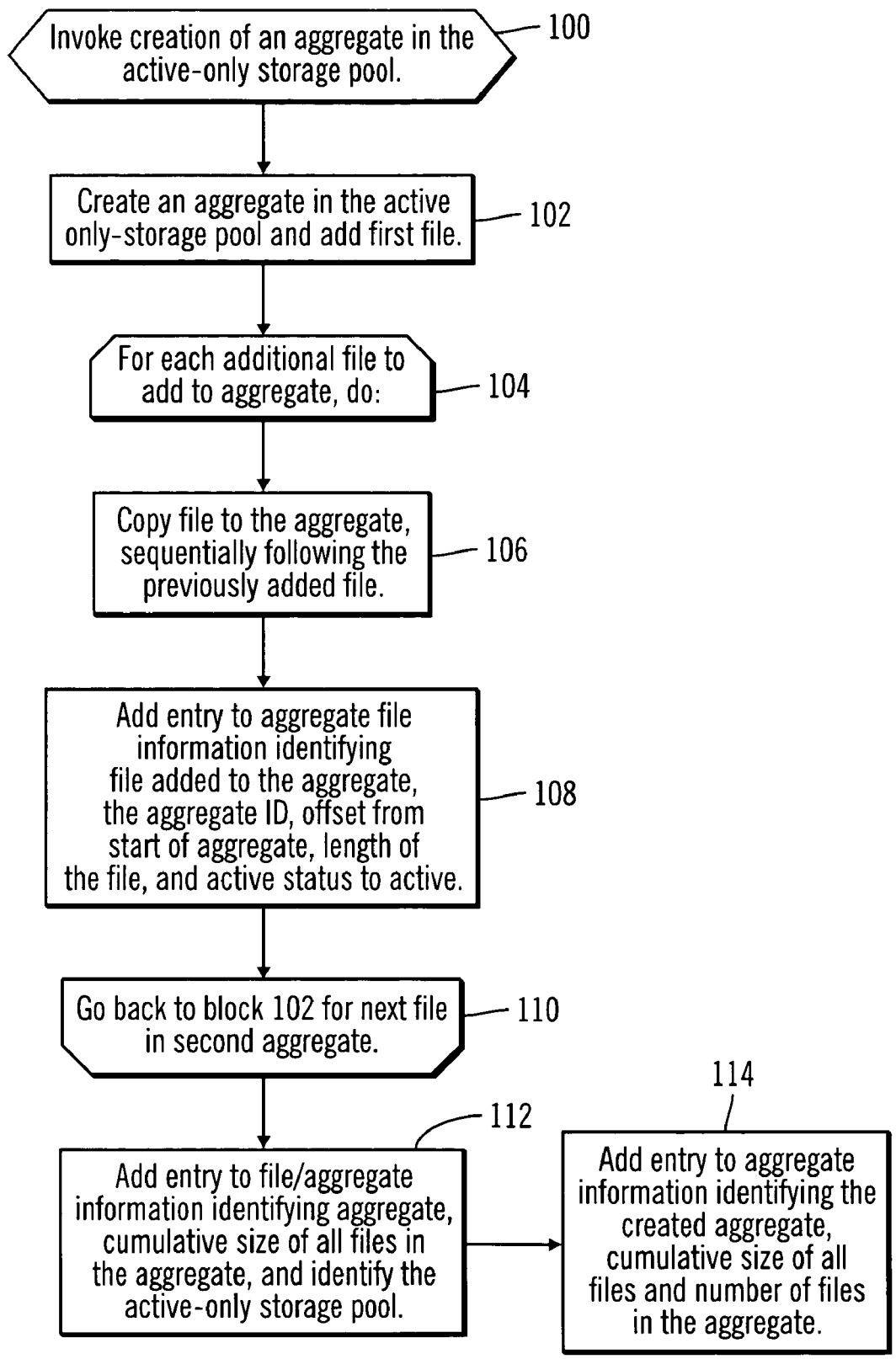
FIG. 6 illustrates an embodiment of operations to create an aggregate in an active-only storage pool.

FIG. 6 illustrates operations performed by the storage management software 12 to create an aggregate in the active-only storage pool 94. The invocation of the storage management software 12 (at block 100) to create an aggregate may be initiated by one client storage agent 10a, 10b . . . 10n or an administrator at the storage management server 6. An aggregate 96 is created (at block 102) in the active only-storage pool 94 and the first file is added, e.g., file A in FIG. 5. A loop is performed at blocks 104 through 110 for each additional file to add to the aggregate 94. The file to add is copied (at block 106) to the aggregate 94, sequentially following the previously added file. The storage management software 12 adds (at block 108) an aggregate file information entry 80 to the file 16 or aggregate 18 information, including: an identifier 82 of the file added to the aggregate; the aggregate ID 84, offset 86 from start of aggregate at which file is written; length 88 of the file; and sets the active status 90 to active. After adding all files to the aggregate 96, the storage management software 12 adds (at block 112) a file/aggregate information entry 50 including an aggregate ID 52 of the created aggregate 96, cumulative size 54 of all files in the aggregate 96, and identifying the active-only storage pool 56 including the created aggregate. An aggregate information entry 70 is added (at block 114) including an identifier 72 of the created aggregate, a cumulative size 74 of all files and number of files 76 in the created aggregate.

Figure 7:
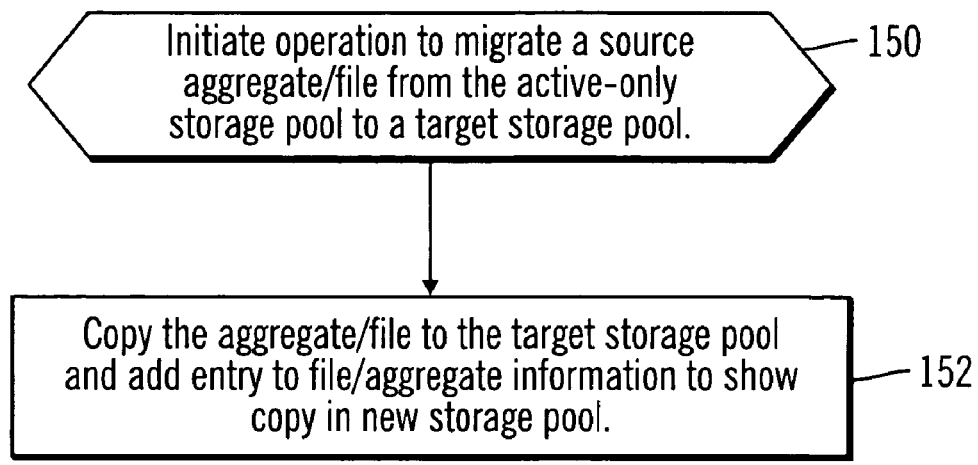
FIG. 7 illustrates an embodiment of operations to migrate an aggregate in an active-only storage pool.

FIG. 7 illustrates an embodiment of operations performed by the storage management software 12 to migrate a source aggregate to a target aggregate, which may be in a tape device. The operations of FIG. 7 may further apply to migration of files not included in an aggregate, such as file D (FIG. 5). Upon initiating (at block 150) an operation to migrate the source aggregate (or source file), the storage management software 12 copies (at block 152) the aggregate 96 (file) to the target storage pool and adds an entry to the file/aggregate information 50 to show the copy of the aggregate (file) in the new storage pool.

Figure 8:
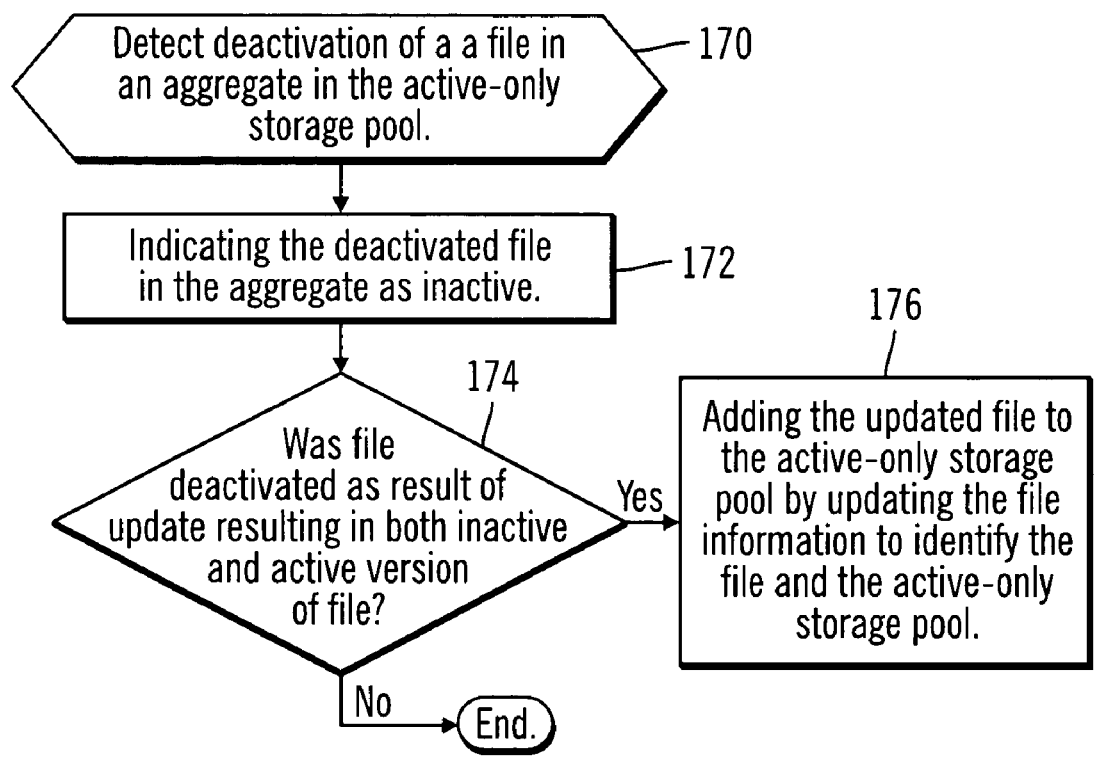
FIG. 8 illustrates an embodiment of operations to deactivate a file in an aggregate in an active-only storage pool.

FIG. 8 illustrates an embodiment of operations performed by the storage management software 12 to process (at block 170) a deactivation of a file in the aggregate 96 in the active-only storage pool 94. As mentioned a file may be deactivated if the file is updated, producing both an active version having the update and an inactive version. Certain deactivations may produce only an inactive version of the file, such as if the file is deleted or the file's age exceeds a policy criteria. In response to the deactivation, the storage management software 12 indicates (at block 172) the active status 90 of the deactivated file in the aggregate as inactive. If (at block 174) the file was deactivated as a result of an update operation, then the active version is added (at block 176) to the active-only storage pool 94 by updating the file information to identify the file and the active-only storage pool. This operation may involve adding an entry 50 to the file/aggregate information for the updated file and assigning a new ID 52 and indicating the size 54 and storage pool 56 including the updated file. Alternatively, the updated active file may be stored in an aggregate with other files and/or copied to other storage pools. If (at block 172) the file was not deactivated in a manner that results in both an active and inactive version, then control ends.

Figure 9:
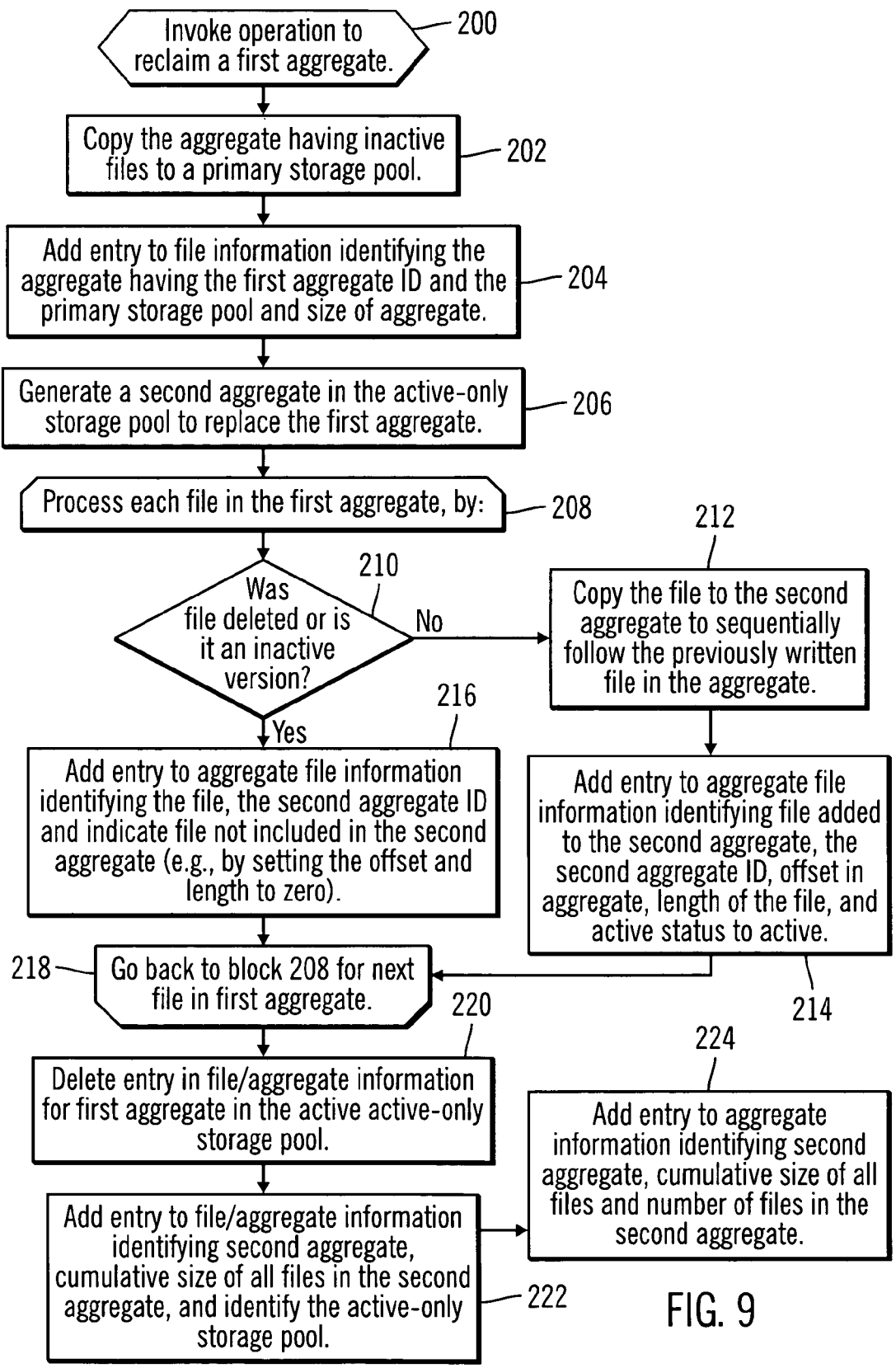
FIG. 9 illustrates an embodiment of operations to reclaim files in an aggregate in an active-only storage pool.

FIG. 9 illustrates an embodiment of operations implemented by the storage management software 12 to reclaim free space in an aggregate in the active-only storage pool 94 in a sequential storage device, which also removes any inactive files from the aggregate in the active-only storage pool 94 to maintain only active files in the active-only storage pool 94. At block 200, an operation is invoked to reclaim one aggregate 96 in the active-only storage pool 94. This operation may be invoked periodically or in response to an event, such as an update to files in the active-only aggregate. In response, (at block 202) the aggregate having inactive files is copied to a primary storage pool. An entry 50 (FIG. 2) is added (at block 204) to the file information identifying the aggregate having the first aggregate ID, e.g., 100, and the primary storage pool and size of the copied aggregate, i.e., the length of all the files in the copied aggregate.

The storage management software 12 generates (at block 206) a second aggregate in the active-only storage pool 96 to replace the first aggregate. The second aggregate has a new identifier (ID) different from the first aggregate ID. A loop is then performed at blocks 208 through 218 for each file in the first aggregate to reclaim. If (at block 210) the file is active, i.e., not inactive or deleted, then the file is copied (at block 212) to the second aggregate to sequentially follow the previously written file in the storage device if there is already file in the aggregate, else the file is written at the start of the aggregate. An aggregate file information entry 80 is added (at block 214) including the file identifier 82, the second aggregate ID 84, the offset 86 in the second aggregate at which the file is written, the length 88 of the file, and the active status 90 is set to active. If (at block 210) the file was inactive or deleted, then an aggregate file information entry 80 (FIG. 4) is added (at block 216) for an inactive file including: the file ID 82; the second aggregate ID 84; and indication that the inactive file is not included in the second aggregate (e.g., by setting the offset and length to zero). Thus, in one embodiment, although the inactive file is no longer included in the reclaimed second aggregate, the aggregate information 18 still indicates in an aggregate file information entry 80 that the inactive file is associated with the second aggregate, but not physically included in the aggregate.

After adding all active files to the new second aggregate file, such that all active files from the first aggregate are written sequentially to the second aggregate in the active only storage pool 94, which may comprise a sequential access disk, the entry 50 (FIG. 2) in the file/aggregate information for the first aggregate in the active active-only storage pool is deleted because it has been reclaimed by the reclaimed second aggregate that does not include the inactive files. A file/aggregate information entry 50 (FIG. 2) is added (at block 222) including the second aggregate ID 52, the cumulative size 54 of all active files in the second aggregate, and the identifier 56 of the active-only storage pool including this second aggregate. Further, an aggregate information entry 70 (FIG. 3) is added (at block 224) including the second aggregate identifier 72, the cumulative size 74 of all files and the number of files 76 in the second aggregate. Thus, during reclamation a new aggregate is created in which all active files are written sequentially removing any inactive files and reclaiming any fee space from the aggregate.

Figure 10:
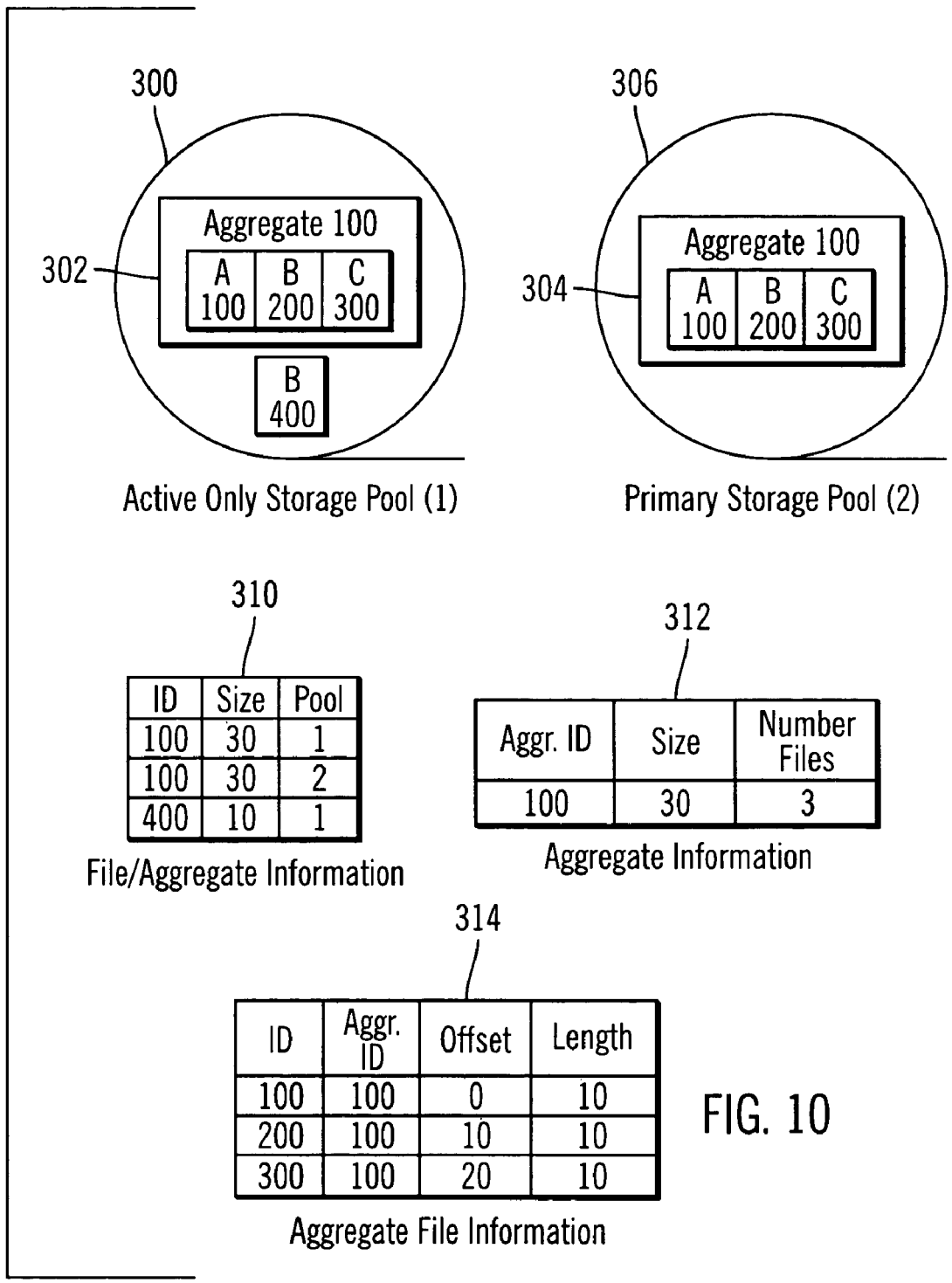
FIGS. 10 and 11 illustrate examples of an active-only storage pool, a primary storage pool, and tables of information on the files and aggregates in the active-only and primary pools.

FIG. 10 illustrates an example of storage pools and tables having information on the aggregates in the storage pools. An active only storage pool 300, having an ID of "1", is implemented in a sequential access media including aggregate 302 having an ID of 100 and three files A, B, C having IDs of 100, 200, 300, respectively. File B 400 comprises an updated version of file B 200 in the aggregate 300. A copy 304 of the aggregate 302 including the inactive version of file B 200 is created in a primary storage pool 306. The aggregate copy 304 has the same ID, i.e., 100, as the aggregate 302. Any changes to the aggregate 302 do not affect the aggregate copy 304 in the primary storage pool 306. File B may also be copied to the primary storage pool 306.

In one embodiment, the storage management software 12 maintains a file/aggregate information table 310, an aggregate information table 312, and an aggregate file information table 314 having information on the files and aggregates in the storage pools 300. The file/aggregate information table 310 includes entries, such as entry 50 (FIG. 2), for each aggregate, including two entries for aggregate 100 (having reference numbers 302 and 304) that is in the storage pools identified as 1 and 2 (having reference numbers 300 and 306, respectively), and the updated file having identifier 400. The aggregate information table 312, such as entry 70 (FIG. 3), includes an entry for the aggregate having ID 100, which happens to be located in two storage pools 300 and 306. The aggregate file information table 314 includes entries, such as entry 80 (FIG. 4), for each file in the aggregate having ID 100. In FIG. 10, there is only one aggregate located in two storage pools, so that the aggregate file information table 314 has information on the files in this one aggregate without reference to the storage pools including this aggregate.

Figure 11:
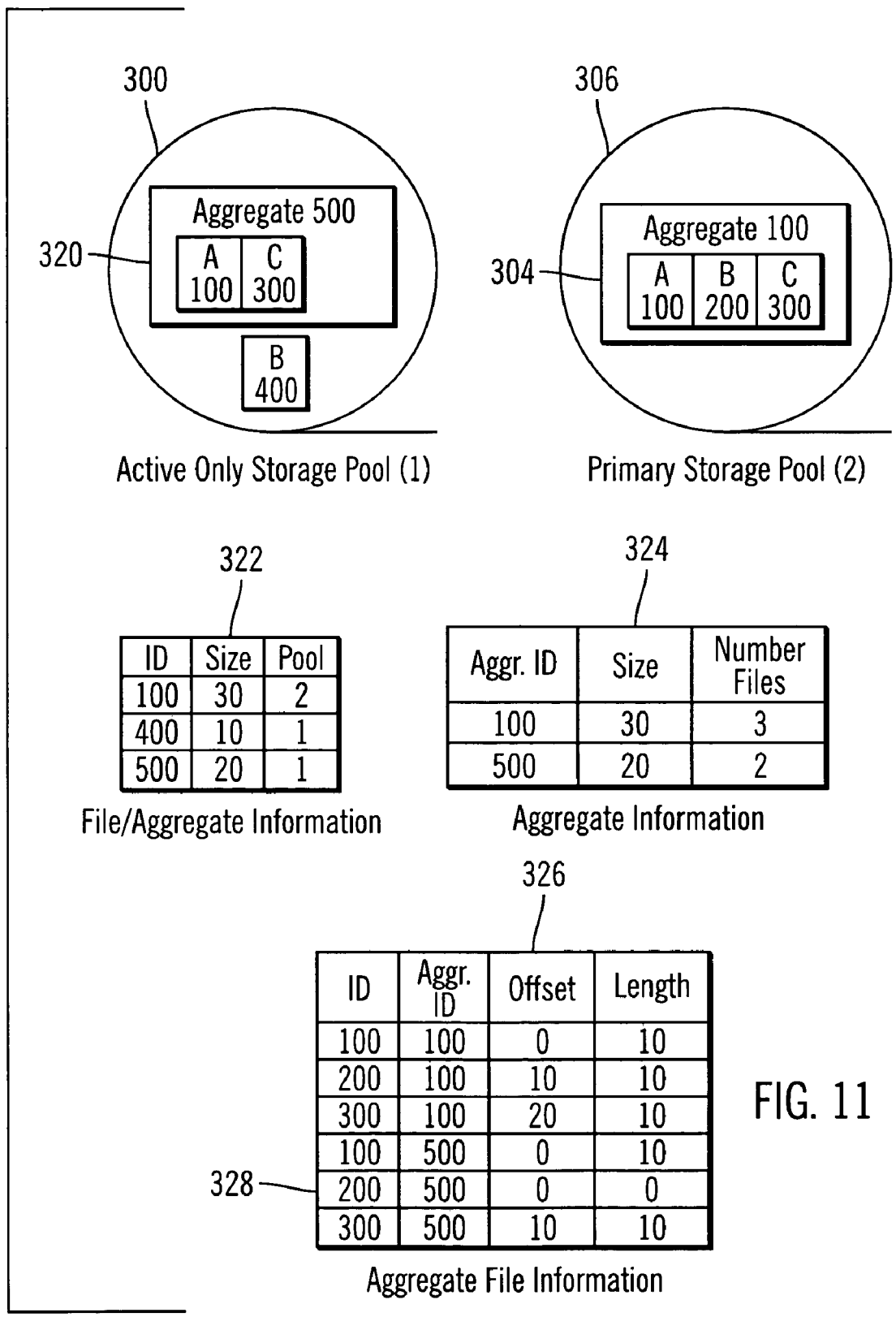

FIG. 11 illustrates an example of storage pools and tables having information on the aggregates in the storage pools after reclamation occurs with respect to the storage pool 300 in FIG. 10. FIG. 11 shows storage pools 300 and 306 as in FIG. 10 and aggregate 304 in storage pool 306. However, in storage pool 300 the aggregate 302 has been replaced by a reclaimed aggregate 320, having ID 500, in which the inactive file B 200 was removed using the operations of FIG. 9. However, the inactive file B 200 remains in the aggregate 304 in the primary storage pool 306. The updated file B 400 is also in the active-only storage pool 300.

The updated file/aggregate information table 322 for FIG. 11 includes entries for the reclaimed aggregate 500 having only active files A and C, which replaces the aggregate 100 in the active-only storage pool 300. The updated aggregate information table 324 includes an entry for the new reclaimed aggregate 500. However, there is still an entry for the aggregate having ID 100 (and having reference number 304) in the primary storage pool 306. The updated aggregate file information table 326 includes new entries for each of the active files A and C in the reclaimed aggregate 500 and additionally one entry 328 for the removed inactive file B 200, which is indicated as not included in the aggregate 500 by having an offset and length of zero. In this embodiment, all inactive files are removed from the aggregate in the active-only storage pool and the inactive file removed is noted in the information maintained by the storage management software 12 as shown in entry 328 in the aggregate file information table 326.

Described embodiments provide an active only storage pool that may be implemented in a sequential media, such that any files in an aggregate in the active-only storage pool that become inactive as a result of an update or other deactivation are removed from the aggregate file during a reclamation operation, so that all the active files are written sequentially in the aggregate file. Further, by maintaining only active files in an aggregate, the client may restore the active data faster from either the active-only storage pool or a copy of the aggregate having active data, which may be on disk or tape. In this way, the active files may be streamed from the aggregate managed file on the tape or disk media. This allows the client to restore the active files faster, which the client is more likely to need than inactive files.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

In described embodiments, the aggregate files were contained in a sequential access media, such as a sequential disk or tape. In an alternative embodiment, the described operations may apply to an aggregate file in a random access media.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Further, when a reference letter, such as "a", "b", or "n" is used to denote a certain number of items, the reference "a", "b" or "n" used with different elements may indicate the same or different number of such elements.

FIGS. 2, 3, 4, 10, and 11 show information maintained in a certain format. In alternative embodiments, the information shown in FIGS. 2, 3, 4, 10, and 11 may be maintained in alternative data structures and formats, and in different combinations.

The illustrated operations of FIGS. 6, 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing a plurality of storage pools including one active-only storage pool, wherein each storage pool includes files, wherein the active-only storage pool is intended to include only active files and not inactive versions of files, and wherein the active-only storage pool includes at least a first aggregate including a plurality of files, wherein the files in the first aggregate are maintained in a sequential ordering;
deactivating one file in the first aggregate in the active only storage pool to produce an inactive version of the file, wherein the first aggregate includes the inactive version of the file;
determining inactive versions of files in the first aggregate;
generating a second aggregate in the active only storage pool including the active files from the first aggregate in the sequential ordering of the first aggregate and not including the determined inactive versions of files from the first aggregate, wherein the second aggregate replaces the first aggregate in the active-only storage pool, wherein files are stored sequentially in the first and second aggregates in a manner in which data is stored in a sequential access storage device, and wherein the active versions of the files in the first aggregate storage pool are written in the sequential ordering of the first aggregate to the second aggregate such that the active version of the files are stored sequentially in the second aggregate;
copying the first aggregate to a copy of the first aggregate in an additional storage pool of the plurality of storage pools, wherein the copy maintains the determined inactive version of files in the first aggregate; and
maintaining aggregate information for the first aggregate, wherein the information for the first aggregates indicates the first aggregate identifier, a number of files in the first aggregate, and a size of the first or second aggregate, wherein the first aggregate is located in the active-only storage pool and the additional storage pool.

2. The method of claim 1, wherein the file is deactivated as a result of an update to the file, wherein updating the file produces an active version of the file in addition to the inactive version of the file, and wherein the active version of the file is included in the active-only storage pool and not included in the second aggregate.

3. The method of claim 1, wherein the active-only storage pool comprises a sequential access storage pool in which files in the aggregate are written sequentially and wherein the aggregates are periodically processed to generate the second aggregate including only active files from the processed aggregate, wherein the active files in the generated second aggregate are written sequentially.

4. The method of claim 1, further comprising:
copying the determined inactive version of files in the first aggregate to another storage pool.

5. The method of claim 1, further comprising:
generating a copy of the first aggregate in an additional storage pool of the plurality of storage pools, wherein the copy maintains the determined inactive version of files in the first aggregate.

6. The method of claim 1, wherein the first aggregate has a first identifier and the second aggregate has a second identifier, further comprising:
providing a data structure having information on defined aggregates including an aggregate identifier and storage pool for each indicated aggregate;
removing information on the first aggregate from the data structure in response to generating the second aggregate; and
adding information on the second aggregate to the data structure including the second identifier in response to generating the second aggregate.

7. The method of claim 6, wherein the file is deactivated as a result of an update to the file, wherein updating the file produces an active version of the file in addition to the inactive version of the file, further comprising:
adding information to the data structure for the active version of the file having a third identifier and indicating that the active version of the file is in the active-only storage pool.

8. The method of claim 6, wherein information for aggregates in the data structure indicates a cumulative size of all files included in the aggregate and a number of files included in the aggregate.

9. The method of claim 6, wherein the data structure comprises a first data structure, further comprising:
providing a second data structure having information on files included in aggregates including the aggregate identifier of the aggregate including the file, wherein the aggregate identifier for the files is the first identifier before the second aggregate is generated; and
updating the aggregate identifier for files indicated in the second data structure having the first identifier to the second identifier in response to generating the second aggregate.

10. The method of claim 9, farther comprising:
updating the information in the second data structure for the determined inactive files having the second identifier to indicate that the files are not included in the second aggregate.

11. The method of claim 10, wherein indicating that the inactive files are not included in the second aggregate comprises setting a length of the inactive files indicated in the second data structure to indicate that the file was removed.

12. The method of claim 1, wherein each storage pool comprises a sequential access storage pool in which data is stored sequentially in a file volume, wherein each sequential access storage pool is implemented in a random access media, and wherein data in the sequential access stored pool is maintained as data is maintained for a sequential access device.

13. The method of claim 1, further comprising:
maintaining aggregate file information having an entry for each file stored in the first aggregate, wherein each entry indicates a file identifier, a first aggregate identifier, and an ordering of the files in the first aggregate, wherein the sequential ordering of files in the first aggregate is indicated by the order indicated in the entries for the files of the first aggregate in the aggregate file information, wherein the files in the second aggregate are included in the order indicated in the entries of the files in the first aggregate in the aggregate file information.

14. The method of claim 13, wherein the order indicated in the entries in the aggregate file information comprises an offset indicating an offset of the file in the first aggregate, wherein the files in the first aggregate are included in the second aggregate according to an order of their offsets indicated in the file entries in the aggregate file information.

15. The method of claim 13, further comprising:
adding entries to the aggregate file information for each file from the first aggregate included in the second aggregate, wherein each added entry identifies the included file, a second aggregate identifier, and an order in which the file was included in the second aggregate.

16. The method of claim 15, further comprising:
deleting entries in the aggregate file information for each entry indicating the first aggregate identifier in response to adding the entries to the aggregate file information for the files in the second aggregate.

17. The method of claim 15, further comprising:
adding an entry to the aggregate file information for each inactive file in the first aggregate not copied to the second aggregate indicating the file identifier of the inactive file not copied, the second aggregate identifier, and indication that the file was not copied.

18. The method of claim 1, wherein the sequential ordering of the files in the first aggregate is indicated in aggregate file information.

19. A system in communication with at least one storage system, comprising:
a processor in communication with the storage pools; and
a computer readable storage medium including a program executed by the processor to perform operations, the operations comprising:
providing a plurality of storage pools including one active-only storage pool, wherein each storage pool includes files, wherein the active-only storage pool is intended to include only active files and not inactive versions of files, and wherein the active-only storage pool includes at least a first aggregate including a plurality of files, wherein the files in the first aggregate are maintained in a sequential ordering;
deactivating one file in the first aggregate in the active only storage pool to produce an inactive version of the file, wherein the first aggregate includes the inactive version of the file;
determining inactive versions of files in the first aggregate; and
generating a second aggregate in the active only storage pool including the active files from the first aggregate in the sequential ordering of the first aggregate and not including the determined inactive versions of files from the first aggregate, wherein the second aggregate replaces the first aggregate in the active-only storage pool, wherein files are stored sequentially in the first and second aggregates in a manner in which data is stored in a sequential access storage device, and wherein the active versions of the files in the first aggregate storage pool are written in the sequential ordering of the first aggregate to the second aggregate such that the active version of the files are stored sequentially in the second aggregate;

copying the first aggregate to a copy of the first aggregate in an additional storage pool of the plurality of storage pools, wherein the copy maintains the determined inactive version of files in the first aggregate; and maintaining aggregate information for the first aggregate, wherein the information for the first aggregates indicates the first aggregate identifier, a number of files in the first aggregate, and a size of the first or second aggregate, wherein the first aggregate is located in the active-only storage pool and the additional storage pool.

maintaining aggregate information for the first aggregate, wherein the information for the first aggregates indicates the first aggregate identifier, a number of files in the first aggregate, and a size of the first or second aggregate, wherein the first aggregate is located in the active-only storage pool and the additional storage pool.

20. The system of claim 19, wherein the file is deactivated as a result of an update to the file, wherein updating the file produces an active version of the file in addition to the inactive version of the file, and wherein the active version of the file is included in the active-only storage pool and not included in the second aggregate.

21. The system of claim 19, wherein the operations further comprise:
generating a copy of the first aggregate in an additional storage pool of the plurality of storage pools, wherein the copy maintains the determined inactive version of files in the first aggregate.

22. The system of claim 19, wherein the first aggregate has a first identifier and the second aggregate has a second identifier, wherein the operations further comprise:
providing a data structure having information on defined aggregates including an aggregate identifier and storage pool for each indicated aggregate;
removing information on the first aggregate from the data structure in response to generating the second aggregate; and
adding information on the second aggregate to the data structure including the second identifier in response to generating the second aggregate.

23. The system of claim 22, wherein the data structure comprises a first data structure, wherein the operations further comprise:
providing a second data structure having information on files included in aggregates including the aggregate identifier of the aggregate including the file, wherein the aggregate identifier for the files is the first identifier before the second aggregate is generated; and
updating the aggregate identifier for files indicated in the second data structure having the first identifier to the second identifier in response to generating the second aggregate.

24. The system of claim 19, wherein each storage pool comprises a sequential access storage pool in which data is stored sequentially in a file volume, wherein each sequential access storage pool is implemented in a random access media, and wherein data in the sequential access stored pool is maintained as data is maintained for a sequential access device.

25. The system of claim 19, wherein the operations further comprise:
maintaining aggregate file information having an entry for each file stored in the first aggregate, wherein each entry indicates a file identifier, a first aggregate identifier, and an ordering of the files in the first aggregate, wherein the sequential ordering of files in the first aggregate is indicated by the order indicated in the entries for the files of the first aggregate in the aggregate file information, wherein the files in the second aggregate are included in the order indicated in the entries of the files in the first aggregate in the aggregate file information.

26. The system of claim 25, wherein the order indicated in the entries in the aggregate file information comprises an offset indicating an offset of the file in the first aggregate, wherein the files in the first aggregate are included in the second aggregate according to an order of their offsets indicated in the file entries in the aggregate file information.

27. The system of claim 25, wherein the operations further comprise:
adding entries to the aggregate file information for each file from the first aggregate included in the second aggregate, wherein each added entry identifies the included file, a second aggregate identifier, and an order in which the file was included in the second aggregate.

28. The system of claim 27, wherein the operations further comprise:
deleting entries in the aggregate file information for each entry indicating the first aggregate identifier in response to adding the entries to the aggregate file information for the files in the second aggregate.

29. The system of claim 27, wherein the operations further comprise:
adding an entry to the aggregate file information for each inactive file in the first aggregate not copied to the second aggregate indicating the file identifier of the inactive file not copied, the second aggregate identifier, and indication that the file was not copied.

30. An article of manufacture comprising a computer readable storage medium including code executed by a processor to communicate with at least one storage system and perform operations, the operations comprising:
providing a plurality of storage pools including one active-only storage pool, wherein each storage pool includes files, wherein the active-only storage pool is intended to include only active files and not inactive versions of files, and wherein the active-only storage pool includes at least a first aggregate including a plurality of files, wherein the files in the first aggregate are maintained in a sequential ordering;
deactivating one file in the first aggregate in the active only storage pool to produce an inactive version of the file, wherein the first aggregate includes the inactive version of the file;
determining inactive versions of files in the first aggregate; and
generating a second aggregate in the active only storage pool including the active files from the first aggregate in the sequential ordering of the first aggregate and not including the determined inactive versions of files from the first aggregate, wherein the second aggregate replaces the first aggregate in the active-only storage pool, wherein files are stored sequentially in the first and second aggregates in a manner in which data is stored in a sequential access storage device, and wherein the active versions of the files in the first aggregate storage pool are written in the sequential ordering of the first aggregate to the second aggregate such that the active version of the files are stored sequentially in the second aggregate;

copying the first aggregate to a copy of the first aggregate in an additional storage pool of the plurality of storage pools, wherein the copy maintains the determined inactive version of files in the first aggregate; and maintaining aggregate information for the first aggregate, wherein the information for the first aggregates indicates the first aggregate identifier, a number of files in the first aggregate, and a size of the first or second aggregate, wherein the first aggregate is located in the active- only storage pool and the additional storage pool.

31. The article of manufacture of claim 30, wherein the file is deactivated as a result of an update to the file, wherein updating the file produces an active version of the file in addition to the inactive version of the file, and wherein the active version of the file is included in the active-only storage pool and not included in the second aggregate.

32. The article of manufacture of claim 30, wherein the operations further comprise:

generating a copy of the first aggregate in an additional storage pool of the plurality of storage pools, wherein the copy maintains the determined inactive version of files in the first aggregate.

33. The article of manufacture of claim 30, wherein the first aggregate has a first identifier and the second aggregate has a second identifier wherein the operations further comprise:

providing a data structure having information on defined aggregates including an aggregate identifier and storage pool for each indicated aggregate;

removing information on the first aggregate from the data structure in response to generating the second aggregate; and adding information on the second aggregate to the data structure including the second identifier in response to generating the second aggregate.

34. The article of manufacture of claim 33, wherein the data structure comprises a first data structure, wherein the operations further comprise:

providing a second data structure having information on files included in aggregates including the aggregate identifier of the aggregate including the file, wherein the aggregate identifier for the files is the first identifier before the second aggregate is generated; and updating the aggregate identifier for files indicated in the second data structure having the first identifier to the second identifier in response to generating the second aggregate.

35. The article of manufacture of claim 30, wherein each storage pool comprises a sequential access storage pool in which data is stored sequentially in a file volume, wherein each sequential access storage pool is implemented in a random access media, and wherein data in the sequential access stored pool is maintained as data is maintained for a sequential access device.

36. The article of manufacture of claim 30, wherein the operations further comprise:

maintaining aggregate file information having an entry for each file stored in the first aggregate, wherein each entry indicates a file identifier, a first aggregate identifier, and an ordering of the files in the first aggregate, wherein the sequential ordering of files in the first aggregate is indicated by the order indicated in the entries for the files of the first aggregate in the aggregate file information, wherein the files in the second aggregate are included in the order indicated in the entries of the files in the first aggregate in the aggregate file information.

37. The article of manufacture of claim 36, wherein the order indicated in the entries in the aggregate file information comprises an offset indicating an offset of the file in the first aggregate, wherein the files in the first aggregate are included in the second aggregate according to an order of their offsets indicated in the file entries in the aggregate file information.

38. The article of manufacture of claim 36, wherein the operations further comprise:

adding entries to the aggregate file information for each file from the first aggregate included in the second aggregate, wherein each added entry identifies the included file, a second aggregate identifier, and an order in which the file was included in the second aggregate.

39. The article of manufacture of claim 38, wherein the operations further comprise:

deleting entries in the aggregate file information for each entry indicating the first aggregate identifier in response to adding the entries to the aggregate file information for the files in the second aggregate.

40. The article of manufacture of claim 38, wherein the operations further comprise:

adding an entry to the aggregate file information for each inactive file in the first aggregate not copied to the second aggregate indicating the file identifier of the inactive file not copied, the second aggregate identifier, and indication that the file was not copied.

* * * * *